Patented Dec. 28, 1926.

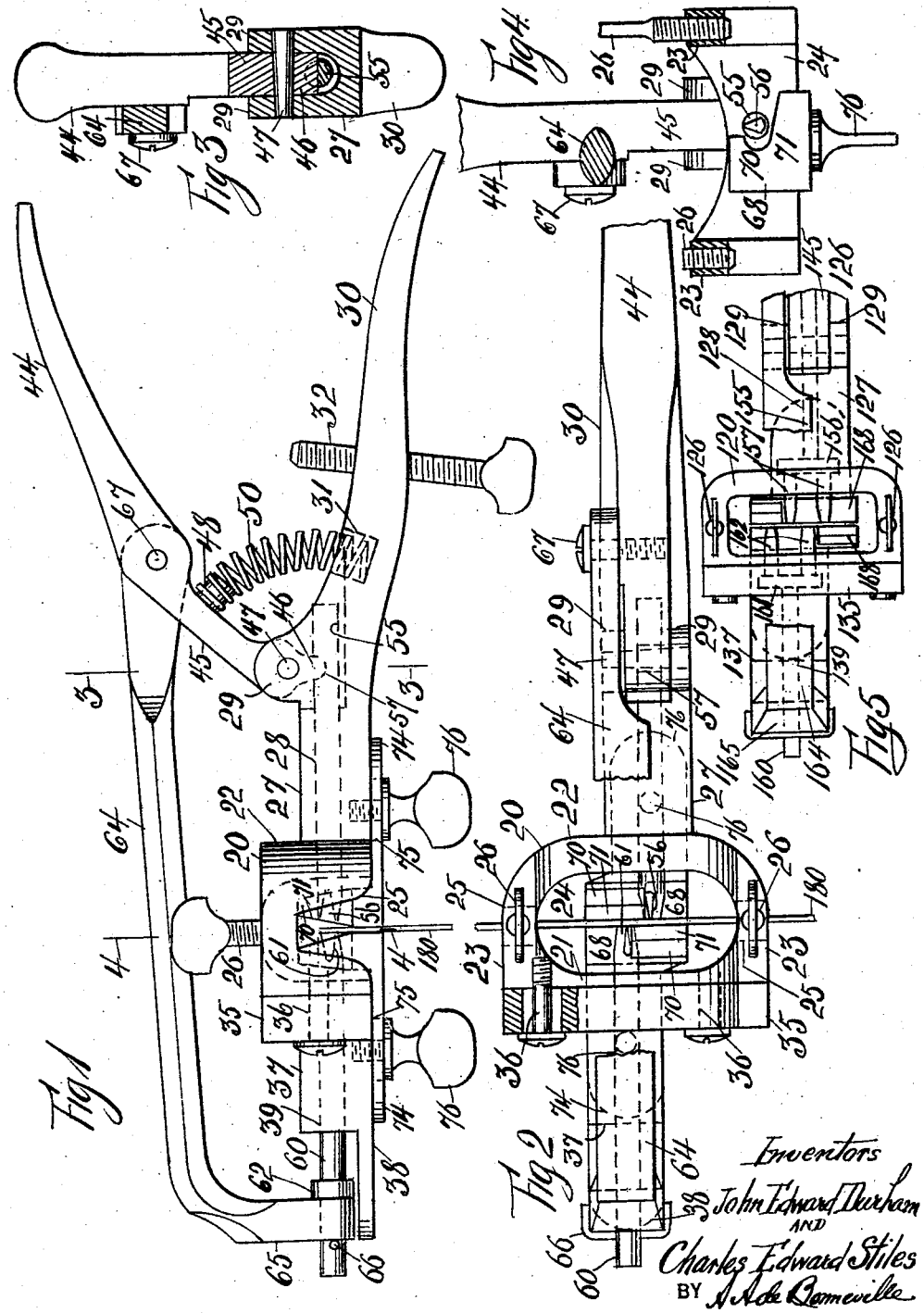

1,612,618

UNITED STATES PATENT OFFICE.

JOHN EDWARD DURHAM AND CHARLES EDWARD STILES, OF COCKBURN HARBOR, BRITISH WEST INDIES, ASSIGNORS TO ALEXANDER J. M. DURHAM, OF COCKBURN HARBOR, BRITISH WEST INDIES.

SAW SET.

Application filed December 29, 1923. Serial No. 683,422.

This invention relates to a saw-set by means of which the teeth of a saw may be set in opposite directions.

The object of the invention is the production of a saw-set, in which a pair of adjacent teeth of a saw can be simultaneously bent or set at opposite and equal inclinations. A second object is the production of means whereby a plurality of pairs of teeth of a saw can be simultaneously set.

The organization of the invention comprises a housing for the reception of the saw or saw blade. The housing is provided with a pair of plungers, with properly shaped heads that simultaneously move in opposite directions, to set or bend the teeth of the saw. Means are also provided to properly locate and maintain the saw in the housing during the operation of bending.

In the accompanying drawings Fig. 1 represents a side elevation of a saw-set exemplifying the invention; Fig. 2 shows a top plan view of Fig. 1; Fig. 3 indicates a section of Fig. 1 on the line 3, 3; Fig. 4 represents a section of Fig. 1 on the line 4, 4 and Fig. 5 indicates a plan view, on a reduced scale of a modification.

The saw-set comprises the housing 20 with the front wall 21, the rear wall 22 and the end walls 23 forming the opening 24 between them. Openings 25 are formed in the walls 23. Adjusting screws 26 engage threaded openings in the said end walls 23.

A guide bracket 27 extends from the rear wall 22 and has formed therewith the guide opening 28, which extends through the rear wall 22. Journal lugs 29 and the lower stationary handle 30 extend from the guide bracket 27. The handle 30 has formed therein the cavity 31, which functions as a spring seat. A stop screw 32 extends through a threaded opening in the handle 30.

To the front wall 21 of the housing 20 is fastened the bracket 35, by means of the screws 36. A guide lug 37 with the table 38 extends from the bracket 35. A guide opening 39 extends through the wall 21, the bracket 35 and the lug 37.

An upper handle 44 has formed therewith an arm 45 and from the lower end of the latter extends the tooth 46. The arm 45 is hinged to the journal lugs 29, by means of the pin 47. A pin 48 extends from the arm 45 and a helical spring 50 has one end thereof supported on the pin 48 and its other end is seated in the cavity 31.

A plunger 55 with the triangular shaped head 56 is slidably located in the guide opening 28. A recess 57 formed in the plunger 55 engages the tooth 46.

A plunger 60 similar to 55 with the triangular shaped head 61 and the collar 62 is slidably guided in the guide opening 39. The plungers 55 and 60 are parallel and spaced a distance equal to the pitch of the teeth of the saw to be set.

A link 64 has formed at one end thereof the depending leg 65. The plunger 60 extends through an opening in the leg 65. The collar 62 bears against the inner face of the leg 65 and the pin 66 extending through the plunger 60 maintains it clamped to the leg 65. The other end of the link 64 is pivoted to the arm 45 by means of the screw pivot 67.

Similar adjusting and clamping blocks are each designated in their entireties by the numeral 68. Each of the blocks 68 comprises the tapered head 70, with the outer face 71. Each of the heads 70 is cut away for its adjacent plunger. A foot 74 with the elongated opening 75 supports the head 70. Each of the heads 70 extends up into the opening 24 of the housing 20, the foot 74 bearing up against the bottom of said housing. Clamping screws 76 extend through the openings 75 and engage threaded openings in the guide bracket 27 and in the guide lug 37.

In Fig. 5 there is shown a fragmentary portion of the saw-set sufficient to point out its modification from that already described.

In Fig. 5 a housing is indicated at 120 similar to 20. Adjusting screws 126 engage threaded openings in the end walls of the housing. A guide bracket 127 similar to 27 extends from the housing 120 and has formed therein the guide opening 128. Journal lugs 129 extend up from the bracket 127. A bracket 135 similar to 35 extends from the front wall of the housing 120. A guide lug 137 extends from the bracket 135. A guide opening 139 is formed in the bracket 135 and in the lug 137. An arm 145 similar to 45 has its lower end pivoted to the journal lugs 129.

A plunger 155 is guided in the guide opening 128 and has formed at one end thereof the cross bar 156 from which extend the pair of plunger heads 157.

A plunger 160 parallel to the plunger 155 is guided in the guide opening 139 and has formed at one end thereof the cross bar 161 from which extend the pair of plunger heads 162 which are parallel to the plunger heads 157.

One of the plunger heads of each of the plungers 155 and 160 is disposed to move in the clearance space between the plunger heads of the other.

A link 164 similar to 64 is indicated with the depending leg 165. Adjusting blocks 168 similar to 68 are provided for the housing 120.

To use the saw-set and referring to Figs. 1 to 4, the saw 180, the teeth of which are to be set is located between the adjusting blocks 68 which latter bear thereon, to maintain the saw at right angles to the axial lines of the plungers 55 and 60. The adjusting screws 26 are previously adjusted independently of each other to locate the saw in the housing with the teeth at the proper level for the said plungers. The operator then bears down on the movable handle 44 and the plungers 55 and 60 move and bear against a pair of adjacent teeth of the saw and bend them in opposite directions. Upon releasing the handle 44 the spring 50 returns it and the plungers to their original position. The strokes of the plungers are controlled by the movements of the handle 44, and the movements of the latter are adjustably controlled by the stop screw 32. The strokes of the plungers controls the angle to which a pair of adjacent teeth are set or bent to opposite inclinations.

The operation of the modification shown in Fig. 5 is similar to that described and results in four teeth being simultaneously set, two in one direction and two in the other, the adjacent teeth inclining in opposite directions as required.

The modification shown in Fig. 5 may be further modified by providing more than two plunger heads for each of the plungers.

Various other modifications may be made in the invention and the present exemplification is to be taken as illustrative and not limitative thereof.

Having described our invention what we desire to secure by Letters Patent and claim is:—

1. In a saw-set the combination of a housing having an opening extending therethrough, adjusting screws extending through a pair of walls of the housing to position a saw to the set, a guide bracket extending from one side of the housing and having a handle formed therewith, said bracket having a guide opening formed therein extending through a wall of the housing, said bracket having a pair of journal lugs formed therewith, a movable handle, an arm extending from the latter handle pivoted to said journal lugs, a tooth formed at the lower end of said handle, a plunger having a triangular shaped head slidably guided in said guide opening and having a recess, said recess engaging the tooth of said arm, a bracket extending from the other side of the housing, a guide lug extending from said bracket, a table extending from the latter bracket, said guide lug having a guide opening parallel to the other guide opening extending into said housing, a second plunger having a triangular shaped head guided in the latter guide opening, a link with one end pivoted to the said arm and its other end fastened to the second plunger, a pair of oppositely positioned adjusting blocks, each with a head extending into the opening of the housing and each of said heads having a foot extending therefrom and means to adjustably fasten said feet to the bottom face of the housing.

2. In a saw-set the combination of a housing having an opening therein, adjusting screws in threaded engagement with the housing adapted to independently adjust and to locate a saw to be set in operative position, adjusting blocks extending into the opening of the housing to maintain the saw to be set in proper position, parallel oppositely positioned plungers guided in the housing and extending into the opening thereof, one of said plungers having a recess, a guide bracket extending from one side of the housing, a stationary handle extending from the guide bracket, an arm pivoted to said guide bracket, a handle extending from said arm, a tooth extending from said arm engaging the recess in said plunger, a link with one end pivoted to said arm and its other end connected to the other plunger and a spring bearing between said handles.

Signed at Cockburn Harbor, Turks and Caicos Islands British West Indies this twelfth day of October, A. D. 1923.

JOHN EDWARD DURHAM.
CHARLES EDWARD STILES.